US012598515B2

(12) United States Patent
Vakeesar et al.

(10) Patent No.: US 12,598,515 B2
(45) Date of Patent: Apr. 7, 2026

(54) NETWORK ENTITIES FOR ENHANCED QoS MONITORING

(71) Applicant: HUAWEI TECHNOLOGIES CO., LTD., Shenzhen (CN)

(72) Inventors: Siva Vakeesar, Kista (SE); Ali Hamidian, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 664 days.

(21) Appl. No.: 17/738,263

(22) Filed: May 6, 2022

(65) Prior Publication Data

US 2022/0264375 A1     Aug. 18, 2022

Related U.S. Application Data

(63) Continuation of application No. PCT/EP2019/080491, filed on Nov. 7, 2019.

(51) Int. Cl.
H04W 28/24          (2009.01)
H04W 28/02          (2009.01)
(Continued)

(52) U.S. Cl.
CPC ....... H04W 28/24 (2013.01); H04W 28/0268 (2013.01); H04W 48/18 (2013.01); H04W 84/042 (2013.01)

(58) Field of Classification Search
CPC . H04W 28/24; H04W 28/0268; H04W 48/18; H04W 84/042; H04W 28/0942; H04W 36/0044; H04W 36/22; H04W 36/08; H04L 41/5009; H04L 41/5032; H04L 43/062; H04L 67/61; H04L 65/80
See application file for complete search history.

(56) References Cited

U.S. PATENT DOCUMENTS

| | | | |
|---|---|---|---|
| 10,492,096 B2 * | 11/2019 | Lee | H04W 8/04 |
| 11,350,475 B2 * | 5/2022 | Youn | H04W 80/02 |

(Continued)

FOREIGN PATENT DOCUMENTS

| | | |
|---|---|---|
| EP | 3238389 B1 | 7/2019 |

OTHER PUBLICATIONS

Huawei, "NG-U Delay Measurement for QoS Monitoring," 3GPP TSG-RAN3 Meeting #105bis, R3-195253, Chongqing, China, Oct. 14-18, 2019, 2 pages.

(Continued)

*Primary Examiner* — Brian T O Connor
(74) *Attorney, Agent, or Firm* — Fish & Richardson P.C.

(57)          ABSTRACT
The disclosure relates to enhanced quality of service (QoS) monitoring. A first network entity receives a request for monitoring non-fulfilment of a QoS requirement of a packet data unit (PDU) session from a second network entity. Based on the received request, the first network entity obtains a QoS requirement of the PDU session from a third network entity and monitors for non-fulfilment of the obtained QoS requirement based on QoS estimates associated with the obtained QoS requirement. In response to detecting a non-fulfilment of the obtained QoS requirement, the first network entity transmits a second message to the second network entity, wherein the second message indicates the non-fulfilment of the obtained QoS requirement of the PDU session.

20 Claims, 4 Drawing Sheets

(51) Int. Cl.
    *H04W 48/18*       (2009.01)
    *H04W 84/04*       (2009.01)

(56)           References Cited

U.S. PATENT DOCUMENTS

| | | | | |
|---|---|---|---|---|
| 11,412,403 | B2 * | 8/2022 | Godin | H04L 47/822 |
| 11,825,332 | B2 * | 11/2023 | Schliwa-Bertling | |
| | | | | H04L 41/5009 |
| 11,956,513 | B2 * | 4/2024 | Nadeau | H04N 21/251 |
| 12,052,657 | B2 * | 7/2024 | Garcia Martin | H04W 36/14 |
| 12,082,050 | B2 * | 9/2024 | Wang | H04W 28/02 |
| 12,133,108 | B2 * | 10/2024 | Wang | H04L 41/145 |
| 12,143,863 | B2 * | 11/2024 | Van Phan | H04W 24/08 |
| 12,185,156 | B2 * | 12/2024 | Wei | H04W 28/0268 |
| 12,185,166 | B2 * | 12/2024 | Kousaridas | H04W 28/0268 |
| 12,231,967 | B2 * | 2/2025 | Wei | H04L 12/1407 |
| 12,238,586 | B2 * | 2/2025 | Ahmad | H04W 4/40 |
| 2018/0324633 | A1 * | 11/2018 | Lee | H04L 47/24 |
| 2019/0222489 | A1 * | 7/2019 | Shan | H04L 41/0894 |
| 2019/0253917 | A1 | 8/2019 | Dao | |
| 2020/0314686 | A1 * | 10/2020 | Godin | H04W 24/08 |
| 2021/0385693 | A1 * | 12/2021 | Wang | H04W 28/24 |
| 2022/0022090 | A1 * | 1/2022 | Schliwa-Bertling | |
| | | | | H04L 41/5009 |
| 2022/0312275 | A1 * | 9/2022 | Van Phan | H04L 43/50 |
| 2022/0386164 | A1 * | 12/2022 | Lee | H04W 36/30 |
| 2024/0334520 | A1 * | 10/2024 | Pancorbo Marcos | |
| | | | | H04L 67/1027 |
| 2025/0159558 | A1 * | 5/2025 | Wei | H04W 4/24 |

OTHER PUBLICATIONS

[No Author Listed] [online], "How to Implement Time-to-Trigger (TTT) Used in 5G and LTE Handover Modeling?", Aug. 18, 2021, retrieved on Nov. 11, 2022, retrieved from URL <https://tetcos.freshdesk.com/support/solutions/articles/14000084404-how-to-implement-time-to-trigger-ttt-used-in-lte-handover-modeling->, 11 pages.

Ericsson et al., "Update of QoS Related Analytics Terminology," 3GPP TSG-SA WG2 Meeting #134, S2-1908222, Sapporo, Japan, Jun. 24-28, 2019, 2 pages.

3GPP TS 23.032 V15.1.0, "3rd Generation Partnership Project; Technical Specification Group Services and System Aspects; Universal Geographical Area Description (GAD) (Release 15)," Sep. 2018, 32 pages.

3GPP TS 23.271 V15.1.0, "3rd Generation Partnership Project; Technical Specification Group Services and System Aspects; Functional Stage 2 Description of Location Services (LCS) (Release 15)," Sep. 2018, 184 pages.

3GPP TS 23.273 V16.0.0, "3rd Generation Partnership Project; Technical Specification Group Services and System Aspects; 5G System (5GS) Location Services (LCS); Stage 2 (Release 16)," Jun. 2019, 86 pages.

3GPP TS 23.287 V16.1.0, "3rd Generation Partnership Project; Technical Specification Group Services and System Aspects; Architecture Enhancements for 5G System (5GS) to Support Vehicle-to-Everything (V2X) Services (Release 16)," Dec. 2019, 51 pages.

3GPP TS 23.288 V16.1.0, "3rd Generation Partnership Project; Technical Specification Group Services and System Aspects; Architecture Enhancements for 5G System (5GS) to Support Network Data Analytics services (Release 16)," Sep. 2019, 52 pages.

3GPP TS 23.501 V16.0.0, "3rd Generation Partnership Project; Technical Specification Group Services and System Aspects; System Architecture for the 5G System; Stage 2 (Release 16)," Mar. 2019, 318 pages.

3GPP TS 28.533 V16.1.0, "3rd Generation Partnership Project; Technical Specification Group Services and System Aspects; Management and Orchestration; Architecture Framework (Release 16)," Sep. 2019, 27 pages.

3GPP TS 28.552 V16.2.0, "3rd Generation Partnership Project; Technical Specification Group Services and System Aspects; Management and Orchestration; 5G Performance Measurements (Release 16)," Jun. 2019, 98 pages.

3GPP TS 28.554 V16.1.0, "3rd Generation Partnership Project; Technical Specification Group Services and System Aspects; Management and Orchestration; 5G End to End Key Performance Indicators (KPI) (Release 16)," Jun. 2019, 20 pages.

3GPP TS 36.314 V15.2.0, "3rd Generation Partnership Project; Technical Specification Group Radio Access Network; Evolved Universal Terrestrial Radio Access (E-UTRA); Layer 2—Measurements (Release 15)," Dec. 2018, 28 pages.

3GPP TR 37.816 V16.0.0, "3rd Generation Partnership Project; Technical Specification Group Radio Access Network; Study on RAN-Centric Data Collection and Utilization for LTE and NR (Release 16)," Jul. 2019, 35 pages.

International Search Report and Written Opinion in International Appln. No. PCT/EP2019/080491, mailed on Aug. 27, 2020, 24 pages.

3GPP TS 23.288 V0.4.0, 3rd Generation Partnership Project; Technical Specification Group Services and System Aspects; Architecture enhancements for 5G System (5GS) to support network data analytics services (Release 16), Apr. 2019, 48 pages.

EP Communication Pursuant to Article 94(3) EPC in European Appln. No. 19804656.7, mailed on Jan. 14, 2026, 15 pages.

* cited by examiner

100

200

300

310

308

312

400

500

600

1

NETWORK ENTITIES FOR ENHANCED QoS MONITORING

CROSS-REFERENCE TO RELATED APPLICATIONS

This application is a continuation of International Application No. PCT/EP2019/080491, filed on Nov. 7, 2019. The disclosure of which is hereby incorporated by reference in its entirety.

TECHNICAL FIELD

The disclosure relates to a first network entity, a second network entity, and a third network entity for enhanced quality of service (QoS) monitoring. Furthermore, the disclosure also relates to corresponding methods and a computer program.

BACKGROUND

In Rel-16 in 3GPP, a basic mechanism to warn a user equipment (UE) whenever a QoS of a packet data unit (PDU) session drops below a pre-agreed performance level was standardized. This mechanism is called QoS sustainability analytics and allows any consumer of QoS sustainability analytics to request analytics information from a network data analytics function (NWDAF). The analytics information may pertain to QoS change statistics for an observation period in the past in a certain area or the likelihood of a QoS change for an observation period in the future in a certain area. The request for analytics information includes an analytics ID and analytics filter Information which may consists of QoS requirements, observation period, and thresholds. At the moment, a typical consumer of QoS sustainability analytics is an application function (AF) which is likely to be untrusted and hence cannot reside within a mobile network operator domain. Depending on whether the indicated thresholds are crossed, the NWDAF will output QoS sustainability analytics including applicable geographical area, applicable time period, crossed thresholds and confidence of analytics.

SUMMARY

An objective of embodiments of the disclosure is to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a first network entity, the first network entity being configured to receive a first message from a second network entity, wherein the first message indicates a request for monitoring non-fulfilment of a quality of service, QoS, requirement of a packet data unit, PDU, session;

obtain a QoS requirement of the PDU session based on the first message;

monitor for non-fulfilment of the obtained QoS requirement based on QoS estimates associated with the obtained QoS requirement; and upon detecting a non-fulfilment of the obtained QoS requirement, transmit a second message to the second network entity, wherein the second message indicates the non-fulfilment of the obtained QoS requirement of the PDU session.

An advantage of the first network entity according to the first aspect is that the QoS requirement for a specific PDU session can be used in the monitoring for non-fulfilment of the QoS requirement. Thereby, the monitoring and the notification of non-fulfillment can be based on network level QoS requirements configured for the PDU session such as e.g. 5G-based QoS requirements and hence be more accurate.

In an implementation form of a first network entity according to the first aspect, the first message indicates the PDU session by at least one of: a PDU session identifier, a QoS flow identifier, an internet protocol, IP, address, a client device location, a public mobile network, PLMN, identifier associated with a client device, a data network name, DNN, and a single network slice selection assistance information, S-NSSAI.

An advantage with this implementation form is that the session-specific identifiers in the first message makes it possible for the first network entity to identify the PDU session of interest and thereby obtain its corresponding network level QoS requirements.

In an implementation form of a first network entity according to the first aspect, obtain the QoS requirement of the PDU session comprises transmit a third message to a third network entity, wherein the third message indicates a request for QoS requirement of the PDU session;

receive a fourth message from the third network entity, wherein the fourth message indicates a QoS requirement of the PDU session.

An advantage with this implementation form is that the first network entity can query and get network level QoS requirements of the PDU session of interest from the third network entity. The first network entity can thereby base the monitoring on network level QoS requirements of the PDU session and hence provide a more accurate monitoring.

In an implementation form of a first network entity according to the first aspect, the third message indicates the PDU session by at least one of: a PDU session identifier, a QoS flow identifier, an IP address, a client device location, a PLMN identifier associated with a client device, a DNN, and a S-NSSAI.

An advantage with this implementation form is that by including session-specific identifiers in the third message, the first network entity can query and get network level QoS requirements of the PDU session of interest from the third network entity.

In an implementation form of a first network entity according to the first aspect, detecting a non-fulfilment of the obtained QoS requirement comprises:

detecting that a QoS estimate associated with the obtained QoS requirement is below or above a threshold value.

An advantage with this implementation form is that the first network entity can base its assessment of whether QoS estimates are outside or inside of the threshold on the obtained network level QoS requirements.

In an implementation form of a first network entity according to the first aspect, detecting a non-fulfilment of the obtained QoS requirement further comprises at least one of:

detecting that a QoS estimate associated with the obtained QoS requirement is below or above a threshold value in a location; and

3 detecting that a QoS estimate associated with the obtained QoS requirement is below or above a threshold value during a time period.

An advantage with this implementation form is that the detection of fulfilment or non-fulfilment can further be made in time and space domain.

In an implementation form of a first network entity according to the first aspect, the first message further indicates at least one of: the threshold value, the location, and the time period.

An advantage with this implementation form is that the first network entity can get and base the monitoring and detection of non-fulfilment on input from the second network entity. The first network entity can thereby generate second messages which are relevant to the second network entity.

In an implementation form of a first network entity according to the first aspect, the second message further indicates at least one of: the QoS estimate associated with the obtained QoS requirement, the location, the time period, and a confidence level associated with the QoS estimate.

An advantage with this implementation form is that with an inclusion of QoS estimate and/or additional information in the second message it is possible for the second network entity to apply appropriate adaptations to e.g. the PDU session or an application using the PDU session.

In an implementation form of a first network entity according to the first aspect, the obtained QoS requirement is at least one of a network layer QoS parameter and a network layer QoS characteristics.

An advantage with this implementation form is that the obtained QoS requirements are network level requirements expressed in terms of known QoS indicators. The first network entity can thereby provide a more accurate monitoring and detection of non-fulfilment.

In an implementation form of a first network entity according to the first aspect, the obtained QoS requirement is associated with a QoS flow of the PDU session.

An advantage with this implementation form is that fine granular adaptation is possible per QoS flow.

In an implementation form of a first network entity according to the first aspect, the first network entity is a network data analytics function, NWDAF.

An advantage with this implementation form is that existing functionality in the NWDAF is augmented to provide accurate network analytics per PDU session.

According to a second aspect of the disclosure, the above mentioned and other objectives are achieved with a second network entity, the second network entity being configured to transmit a first message to a first network entity, wherein the first message indicates a request for monitoring for non-fulfilment of a QoS requirement of a PDU session; receive a second message from the first network entity, wherein the second message indicates a non-fulfilment of a QoS requirement of the PDU session.

An advantage of the second network entity according to the second aspect is that the second network entity can request monitoring for non-fulfilment for a specific PDU session and that the PDU sessions details are passed on to the first network entity. The first network entity can thereby make accurate QoS estimates and provide an improved notification of non-fulfilment to the second network entity.

In an implementation form of a second network entity according to the second aspect, the first message indicates the PDU session by at least one of: a PDU session identifier, a QoS flow identifier, an IP address, a client device location, a PLMN identifier associated with a client device, a DNN, and a S-NSSAI.

An advantage with this implementation form is that the session-specific identifiers in the first message makes it possible for the first network entity to identify the PDU session of interest and thereby obtain its corresponding network level QoS requirements.

In an implementation form of a second network entity according to the second aspect, the first message further indicates at least one of: a threshold value, a location, and a time period.

An advantage with this implementation form is that the second network entity can provide input to the monitoring and detection of non-fulfilment in the first network entity. The first network entity can thereby generate second messages which are relevant to the second network entity.

In an implementation form of a second network entity according to the second aspect, the second message further indicates at least one of: a QoS estimate associated with the QoS requirement of the PDU, a location, a time period, and a confidence level associated with the QoS estimate.

An advantage with this implementation form is that with an inclusion of QoS estimate and/or additional information in the second message it is possible for a second network entity to apply appropriate adaptations to e.g. the PDU session or an application using the PDU session.

In an implementation form of a second network entity according to the second aspect, the second network entity is an application function, AF.

An advantage with this implementation form is that existing functionality in the AF is augmented, enabling the AF to subscribe to PDU specific monitoring for non-fulfilment. The number of subscriptions to the first network entity can thereby be minimized when compared to the case where UE-based subscription is enabled.

According to a third aspect of the disclosure, the above mentioned and other objectives are achieved with a third network entity, the third network entity being configured to receive a third message from a first network entity, wherein the third message indicates a request for QoS requirement of a PDU session; obtain a QoS requirement of the PDU session based on the third message; and transmit a fourth message to the first network entity, wherein the fourth message indicates the obtained QoS requirement of the PDU session.

An advantage of the third network entity according to the third aspect is that based on PDU session details from the first network entity, network level QoS requirements can be obtained and provided to the first network entity.

In an implementation form of a third network entity according to the third aspect, the third message indicates the PDU session by at least one of: a PDU session identifier, a QoS flow identifier, an IP address, a client device location, a PLMN identifier associated with a client device, a DNN, and a S-NSSAI.

An advantage with this implementation form is that the session-specific identifiers in the third message makes it possible for the third network entity to identify a PDU session of interest uniquely and thereby obtain its corresponding network level QoS requirements.

In an implementation form of a third network entity according to the third aspect, the QoS requirement of the PDU session is at least one of a network layer QoS parameter and a network layer QoS characteristics.

An advantage with this implementation form is that the first network entity can query and get network level QoS requirements of the PDU session of interest, expressed in terms of known QoS indicators, from the third network entity.

In an implementation form of a third network entity according to the third aspect, the QoS requirement of the PDU session is associated with a QoS flow of the PDU session.

An advantage with this implementation form is that fine granular adaptation is possible per QoS flow.

In an implementation form of a third network entity according to the third aspect, the third network entity is a session management function, SMF, or an access and mobility management function, AMF.

An advantage with this implementation form is that existing functionality in the SMF or AMF is augmented such that the SMF or the AMF can provide network level QoS requirements of the PDU session to the first network entity, e.g. the NWDAF.

According to a fourth aspect of the disclosure, the above mentioned and other objectives are achieved with a method for a first network entity, the method comprises receiving a first message from a second network entity, wherein the first message indicates a request for monitoring non-fulfilment of a QoS requirement of a PDU session; obtaining a QoS requirement of the PDU session based on the first message; monitoring for non-fulfilment of the obtained QoS requirement based on QoS estimates associated with the obtained QoS requirement; and upon detecting a non-fulfilment of the obtained QoS requirement, transmitting a second message to the second network entity, wherein the second message indicates the non-fulfilment of the obtained QoS requirement of the PDU session.

The method according to the fourth aspect can be extended into implementation forms corresponding to the implementation forms of the first network entity according to the first aspect. Hence, an implementation form of the method comprises the feature(s) of the corresponding implementation form of the first network entity.

The advantages of the methods according to the fourth aspect are the same as those for the corresponding implementation forms of the first network entity according to the first aspect.

According to a fifth aspect of the disclosure, the above mentioned and other objectives are achieved with a method for a second network entity, the method comprises transmitting a first message to a first network entity, wherein the first message indicates a request for monitoring for non-fulfilment of a QoS requirement of a PDU session; receiving a second message from the first network entity, wherein the second message indicates a non-fulfilment of a QoS requirement of the PDU session.

The method according to the fifth aspect can be extended into implementation forms corresponding to the implementation forms of the second network entity according to the second aspect. Hence, an implementation form of the method comprises the feature(s) of the corresponding implementation form of the second network entity.

The advantages of the methods according to the fifth aspect are the same as those for the corresponding implementation forms of the second network entity according to the second aspect.

According to a sixth aspect of the disclosure, the above mentioned and other objectives are achieved with a method for a third network entity, the method comprises receiving a third message from a first network entity, wherein the third message indicates a request for QoS requirement of a PDU session; obtaining a QoS requirement of the PDU session based on the third message; and transmitting a fourth message to the first network entity, wherein the fourth message indicates the obtained QoS requirement of the PDU session.

The method according to the sixth aspect can be extended into implementation forms corresponding to the implementation forms of the third network entity according to the third aspect. Hence, an implementation form of the method comprises the feature(s) of the corresponding implementation form of the third network entity.

The advantages of the methods according to the sixth aspect are the same as those for the corresponding implementation forms of the third network entity according to the third aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

The basic concept of the QoS sustainability analytics as currently presented has many drawbacks. One major drawback is that the AF is not able to indicate exact QoS requirements of an application in terms of network level QoS, such as e.g. 5QI (5G QoS Identifier), in the request for analytics information. In addition, the QoS sustainability analytics mechanism is not able to provide notification on a user equipment (UE) basis and relies on generic measurements to make QoS estimates.

Figure 1:
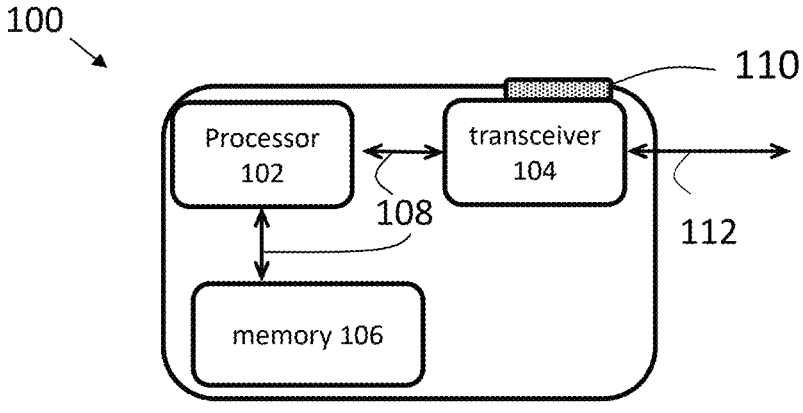
FIG. 1 shows a first network entity according to an embodiment of the disclosure.

FIG. 1 shows a first network entity 100 according to an embodiment of the disclosure. In the embodiment shown in FIG. 1, the first network entity 100 comprises a processor 102, a transceiver 104 and a memory 106. The processor 102 is coupled to the transceiver 104 and the memory 106 by communication means 108 known in the art. The first network entity 100 may be configured for both wireless and wired communications in wireless and wired communication systems, respectively. The wireless communication capability may be provided with an antenna or antenna array 110 coupled to the transceiver 104, while the wired communication capability may be provided with a wired communication interface 112 coupled to the transceiver 104.

The processor 102 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 106 may be a read-only memory, a random access memory, or a non-volatile random access memory (NVRAM).

The transceiver 104 may be a transceiver circuit, a power controller, an antenna, or an interface which communicates with other modules or devices.

In embodiments, the transceiver 104 may be a separate chipset, or it is integrated with processor in one chipset. While in some implementations, the transceiver 104 the memory 106 and the processor 102 are integrated in one chipset.

That the first network entity 100 is configured to perform certain actions can in this disclosure be understood to mean that the first network entity 100 comprises suitable means, such as e.g. the processor 102 and the transceiver 104, configured to perform said actions.

According to embodiments of the disclosure the first network entity 100 is configured to receive a first message 510 from a second network entity 300. The first message 510 indicates a request for monitoring non-fulfilment of a quality of service (QoS) requirement of a packet data unit (PDU) session. The first network entity 100 is further configured to obtain a QoS requirement of the PDU session based on the first message 510 and monitor for non-fulfilment of the obtained QoS requirement based on QoS estimates associated with the obtained QoS requirement. Upon detecting a non-fulfilment of the obtained QoS requirement, the first network entity 100 is configured to transmit a second message 520 to the second network entity 300. The second message 520 indicates the non-fulfilment of the obtained QoS requirement of the PDU session.

Figure 2:
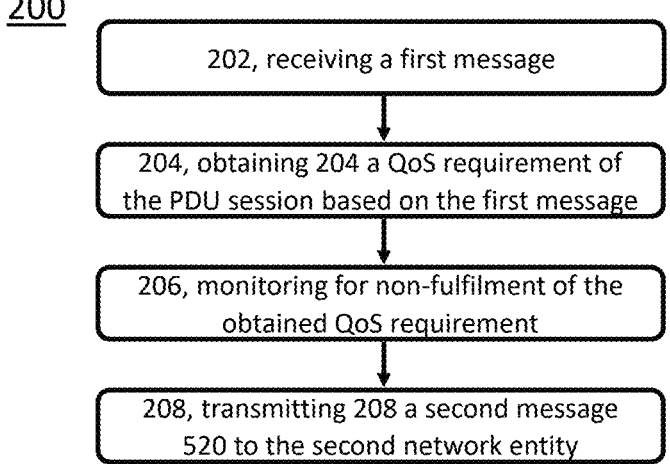
FIG. 2 shows a method for a first network entity according to an embodiment of the disclosure.

FIG. 2 shows a flow chart of a corresponding method 200 which may be executed in a first network entity 100, such as the one shown in FIG. 1. The method 200 comprises receiving 202 a first message 510 from a second network entity 300, wherein the first message 510 indicates a request for monitoring non-fulfilment of a QoS requirement of a PDU session. The method 200 further comprises obtaining 204 a QoS requirement of the PDU session based on the first message 510 and monitoring 206 for non-fulfilment of the obtained QoS requirement based on QoS estimates associated with the obtained QoS requirement. Upon detecting a non-fulfilment of the obtained QoS requirement, the method 200 comprises transmitting 208 a second message 520 to the second network entity 300, wherein the second message 520 indicates the non-fulfilment of the obtained QoS requirement of the PDU session.

Figure 3:
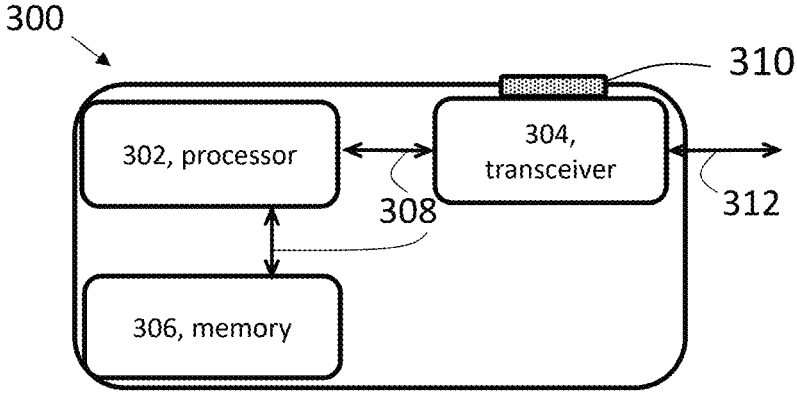
FIG. 3 shows a second network entity according to an embodiment of the disclosure.

FIG. 3 shows a second network entity 300 according to an embodiment of the disclosure. In the embodiment shown in FIG. 3, the second network entity 300 comprises a processor 302, a transceiver 304 and a memory 306. The processor 302 is coupled to the transceiver 304 and the memory 306 by communication means 308 known in the art. The second network entity 300 may be configured for both wireless and wired communications in wireless and wired communication systems, respectively. The wireless communication capability may be provided with an antenna or antenna array 310 coupled to the transceiver 304, while the wired communication capability may be provided with a wired communication interface 312 coupled to the transceiver 304.

The processor 302 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 306 may be a read-only memory, a random access memory, or a non-volatile random access memory (NVRAM).

The transceiver 304 may be a transceiver circuit, a power controller, an antenna, or an interface which communicates with other modules or devices.

In embodiments, the transceiver 304 may be a separate chipset, or it is integrated with processor in one chipset. While in some implementations, the transceiver 304, the memory 306 and the processor 302 are integrated in one chipset.

That the second network entity 300 is configured to perform certain actions can in this disclosure be understood to mean that the second network entity 300 comprises suitable means, such as e.g. the processor 302 and the transceiver 304, configured to perform said actions.

According to embodiments of the disclosure the second network entity 300 is configured to transmit a first message 510 to a first network entity 100, wherein the first message 510 indicates a request for monitoring for non-fulfilment of a QoS requirement of a PDU session. The second network entity 300 is further configured to receive a second message 520 from the first network entity 100, wherein the second message 520 indicates a non-fulfilment of a QoS requirement of the PDU session.

Figure 4:
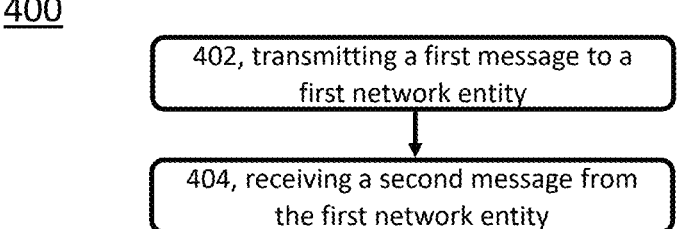
FIG. 4 shows a method for a second network entity according to an embodiment of the disclosure.

FIG. 4 shows a flow chart of a corresponding method 400 which may be executed in a second network entity 300, such as the one shown in FIG. 3. The method 400 comprises transmitting 402 a first message 510 to a first network entity 100, wherein the first message 510 indicates a request for monitoring for non-fulfilment of a QoS requirement of a PDU session. The method 400 further comprises receiving 404 a second message 520 from the first network entity 100, wherein the second message 520 indicates a non-fulfilment of a QoS requirement of the PDU session.

Figure 5:
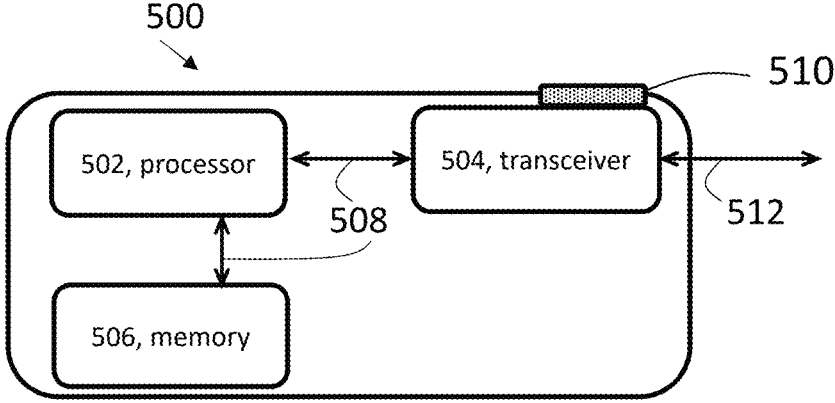
FIG. 5 shows a third network entity according to an embodiment of the disclosure.

FIG. 5 shows a third network entity 500 according to an embodiment of the disclosure. In the embodiment shown in FIG. 5, the third network entity 500 comprises a processor 502, a transceiver 504 and a memory 506. The processor 502 is coupled to the transceiver 504 and the memory 506 by communication means 508 known in the art. The third network entity 500 may be configured for both wireless and wired communications in wireless and wired communication systems, respectively. The wireless communication capability may be provided with an antenna or antenna array 501 coupled to the transceiver 504, while the wired communication capability may be provided with a wired communication interface 512 coupled to the transceiver 504.

The processor 502 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 506 may be a read-only memory, a random access memory, or a non-volatile random access memory (NVRAM).

The transceiver 504 may be a transceiver circuit, a power controller, an antenna, or an interface which communicates with other modules or devices.

In embodiments, the transceiver 504 may be a separate chipset, or it is integrated with processor in one chipset. While in some implementations, the transceiver 504, the memory 506 and the processor 502 are integrated in one chipset.

That the third network entity 500 is configured to perform certain actions can in this disclosure be understood to mean that the third network entity 500 comprises suitable means, such as e.g. the processor 502 and the transceiver 504, configured to perform said actions.

According to embodiments of the disclosure the third network entity 500 is configured to receive a third message 530 from a first network entity 100, wherein the third message 530 indicates a request for QoS requirement of a PDU session, and obtain a QoS requirement of the PDU session based on the third message 530. The third network entity 500 is further configured to transmit a fourth message 540 to the first network entity 100, wherein the fourth message 540 indicates the obtained QoS requirement of the PDU session.

Figure 6:
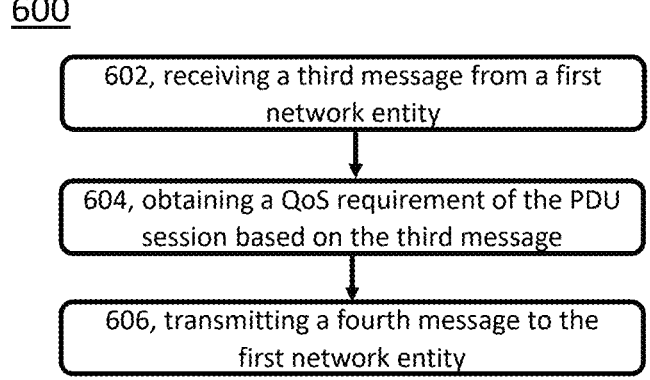
FIG. 6 shows a method for a third network entity according to an embodiment of the disclosure.

FIG. 6 shows a flow chart of a corresponding method 600 which may be executed in a third network entity 500, such as the one shown in FIG. 5. The method 600 comprises receiving 602 a third message 530 from a first network entity 100, wherein the third message 530 indicates a request for QoS requirement of a PDU session, and obtaining 604 a QoS requirement of the PDU session based on the third message 530. The method 600 further comprises transmitting 606 a fourth message 540 to the first network entity 100, wherein the fourth message 540 indicates the obtained QoS requirement of the PDU session.

Figure 7:
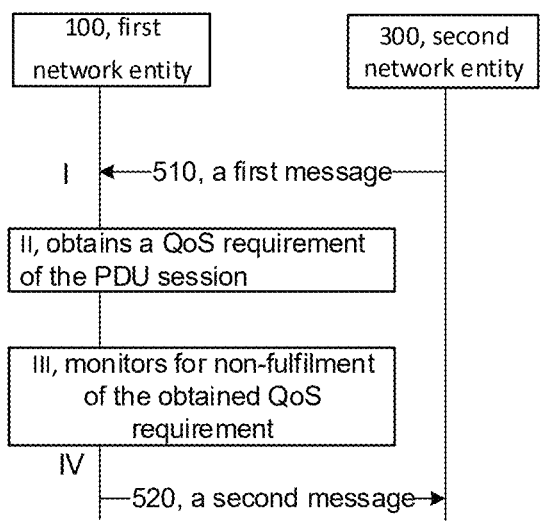
FIG. 7 shows signaling between a first network entity and a second network entity according to an embodiment of the disclosure.

FIG. 7 shows signaling between the first network entity 100 and the second network entity 300 for monitoring for non-fulfilment of a QoS requirement of a PDU session according to an embodiment of the disclosure. In embodiments, the first network entity 100 may be a network data analytics function (NWDAF) and the second network entity 300 may be an application function (AF).

In step I in FIG. 7, the second network entity 300 transmits a first message 510 to the first network entity 100. The first message 510 indicates a request for monitoring for non-fulfilment of a QoS requirement of a PDU session. The first message 510 further indicates the PDU session, either explicitly or implicitly. Thus, the first message 510 comprises information allowing the PDU session for which monitoring is requested to be identified. In embodiments, the first message 510 indicates the PDU session by at least one of: a PDU session identifier (ID), a QoS flow ID (QFI), an internet protocol (IP) address, a client device location, a public mobile network (PLMN) ID associated with a client device, a data network name (DNN) and a single network slice selection assistance information (S-NSSAI).

The second network entity 300 may transmit the first message 510 to the first network entity 100 when the second network entity 300 wants to be notified/informed about non-fulfilment of a QoS requirement of the PDU session. In embodiments, the first message 510 may be a request to fetch information related to monitoring for non-fulfilment of a QoS requirement of the PDU session. However, the first message 510 may also be a request to subscribe to monitoring for non-fulfilment of a QoS requirement of the PDU session. In this case, the first message 510 may trigger a continuous monitoring for non-fulfilment of a QoS requirement of the PDU session in the first network entity 100.

In embodiments where the first network entity 100 is a NWDAF and the second network entity 300 is an AF, the first message 510 may correspond to a Nnef_AnalyticsExposure_Subscribe message or a Nnef_AnalyticsExposure_Fetch message according to the 3GPP standard, with one or more additional information elements.

The first network entity 100 receives the first message 510 indicating the request for monitoring non-fulfilment of a QoS requirement of the PDU session from the second network entity 300, where the first message 510 may indicate the PDU session by at least one of: a PDU session ID, a QFI, an IP address, a client device location, a PLMN ID associated with a client device, a DNN, and a S-NSSAI.

Based on the received first message 510, the first network entity 100 obtains a QoS requirement of the PDU session in step II in FIG. 7. The first network entity 100 may obtain the QoS requirement of the PDU session based on information derived from the first message 510 such as information indicating the PDU session. The obtaining in step II in FIG. 7 may comprise the first network entity 100 fetching the QoS requirement of the PDU session based on the received or derived PDU session information either internally or from another entity. In embodiments, the first network entity 100 may obtain the QoS requirement of the PDU session from a third network entity 500, as will be described below with reference to FIG. 8.

In embodiments, the obtained QoS requirement is at least one of a network layer QoS parameter and a network layer QoS characteristics. The network layer QoS parameters and/or the network layer QoS characteristics can be understood to mean the QoS parameters and/or QoS characteristics configured for the PDU session in the network layer, i.e. assigned to the PDU session during PDU session establishment or modification in the network layer. The network layer QoS parameters may comprise 5G QoS indicator (5QI), allocation and retention priority (ARP), guaranteed flow bit rate (GFBR), maximum flow bit rate (MFBR), and maximum packet loss rate (MPLR) for guaranteed bit rate (GBR) traffic; and further comprise 5QI, ARP, and reflective QoS attribute (RQA) for non-GBR traffic. The network layer QoS characteristics may pertain to e.g. packet error rate (PER) or delay.

The obtained QoS requirement may further be associated with a QoS flow of the PDU session. The PDU session may comprise one or more QoS flows, where each QoS flow may be associated with specific QoS requirements as defined in a QoS profile. Hence, the QoS requirement may in embodiments be obtained from a QoS profile associated with a QoS flow belonging to the PDU session.

In step III in FIG. 7, the first network entity 100 monitors for non-fulfilment of the obtained QoS requirement based on QoS estimates associated with the obtained QoS requirement. The monitoring in step III in FIG. 7 may comprise the first network entity 100 obtaining and analysing QoS estimates associated with the obtained QoS requirement to detect non-fulfilments of the obtained QoS requirement. The first network entity 100 may derive network analytics to be used for making QoS estimates by obtaining network performance data for example from an operation and maintenance (OAM) entity or other entities gathering/collecting measurements and/or statistic information. The derived network analytics may be related to different key performance indicators (KPIs) such as for example average/maximum bit rates, average/maximum delays, and number of abnormally released QoS flows. From the derived network analytics, the first network entity 100 calculates the QoS estimates associated with the obtained QoS requirement, i.e. the QoS estimates corresponding to the obtained QoS requirements. The QoS estimates can pertain to different QoS parameter KPI such as GFBR or QoS characteristics such as PER and latency. Hence, the QoS estimate can be in terms of data rate, latency, or PER.

In embodiments, detecting a non-fulfilment of the obtained QoS requirement comprises detecting that a QoS estimate associated with the obtained QoS requirement is below or above a threshold value. The first network entity 100 may hence compare QoS estimates associated with the obtained QoS requirement with a threshold value to detect whether the obtained QoS requirement can be fulfilled or not. Depending on the type of QoS requirement a non-fulfilment may correspond to the QoS estimates associated with the obtained QoS requirement being either below or above the threshold value. For example, if the QoS requirement is associated with throughput, a non-fulfilment would be detected if a QoS estimate is equal to or below the threshold value. On the other hand, if the QoS requirement is associated with delay, a non-fulfilment would be detected if a QoS estimate is equal to or above the threshold value.

The detecting of a non-fulfilment of the obtained QoS requirement may further comprise at least one of detecting that a QoS estimate associated with the obtained QoS requirement is below or above a threshold value in a location, and detecting that a QoS estimate associated with the obtained QoS requirement is below or above a threshold value during a time period. In this way, non-fulfilments of the obtained QoS requirement in certain locations and/or during certain time periods may be detected. The location may be an area or a path of interest and may be indicated with a list of waypoints, one or more cells, one or more tracking areas, etc. The time period may be an observation period of interest, either in the past or the future, and may be indicated with a time interval, a start time and/or stop time, etc.

The threshold value, the location, and/or the time period used by the first network entity 100 in the monitoring and detection for non-fulfilments may be provided to the first network entity 100 from the second network entity 300 in the first message 510. Hence, the first message 510 may in embodiments further indicate at least one of: the threshold value, the location, and the time period.

Upon detecting a non-fulfilment of the obtained QoS requirement in step III in FIG. 7, the first network entity 100 transmits a second message 520 to the second network entity 300 in step IV in FIG. 7. The second message 520 indicates the detected non-fulfilment of the obtained QoS requirement of the PDU session.

In embodiments where the first network entity 100 is a NWDAF and the second network entity 300 is an AF, the second message 520 may correspond to a Nnef_AnalyticsExposure_Notify message or a Nnef_AnalyticsExposure_FetchResponse message according to the 3GPP standard, with one or more additional information elements.

The second network entity 300 receives the second message 520 indicating the non-fulfilment of a QoS requirement of the PDU session from the first network entity 100. Thereby, the second network entity 300 is informed about the detected non-fulfilment of a QoS requirement of the PDU session and may take actions to, for example, modify the PDU session, adapt an application, etc.

The detected non-fulfilment of the QoS requirement of the PDU session may be indicated in the second message 520 using a flag or an information element. The second message 520 may also comprise additional information related to the non-fulfilment of the obtained QoS requirement of the PDU session, information which may help the second network entity 300 to take appropriate actions in relation to the non-fulfilment. Thus, the second message 520 transmitted by the first network entity 100 and received by the second network entity 300 may in embodiments further indicate at least one of: the QoS estimate associated with the obtained QoS requirement, the location, the time period, and a confidence level associated with the QoS estimate.

Figure 8:
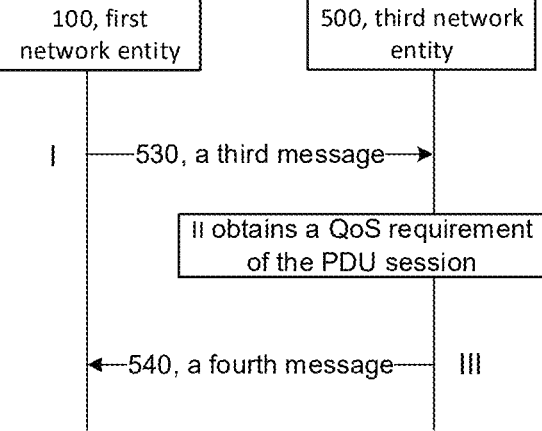
FIG. 8 shows signaling between a first network entity and a third network entity according to an embodiment of the disclosure.

FIG. 8 shows signaling between the first network entity 100 and the third network entity 500 for obtaining a QoS requirement of a PDU session according to an embodiment of the disclosure. The first network entity 100 may initiate the signaling to obtain a QoS requirement of a PDU session in response to receiving the first message 510 from the second network entity 300. In embodiments, the first network entity 100 may be a NWDAF and the third network entity 500 may be a session management function (SMF) or an access and management function (AMF).

In step I in FIG. 8, the first network entity 100 transmits a third message 530 to the third network entity 500. The third message 530 indicates a request for QoS requirement of a PDU session. The third message 530 may indicate the PDU session by at least one of: a PDU session ID, a QFI, an IP address, a client device location, a PLMN ID associated with a client device, a DNN, and an S-NSSAI. The first network entity 100 may transmit the third message 530 to the third network entity 500 through one or more intermediate entities. For example, when the third network entity 500 is a SMF, first network entity 100 may interact with the SMF 500 through an AMF.

In embodiments where the first network entity 100 transmits the third message 530 in response to the reception of the first message 510, the third message 530 indicates a request for QoS requirement of the PDU session indicated in the first message 510. The first message 510 may further comprise information from which the first network entity 100 can identify the third network entity 500 that can provide QoS requirements of the PDU session.

The first network entity 100 may identify the third network entity 500 based on e.g. selected DNN, S-NSSAI, network slice instance (NSI) ID, access technology being used by the UE, support for control plane cellular internet of things (CIoT) 5G system (5GS) optimization, or subscription information from unified data management (UDM). For example, the identity of the third network entity 500 may be obtained by contacting the UDM with S-NSSAI(s), the DNN, the PDU Session ID, as well as the access type of the PDU Session. The first network entity 100 may store an association of the S-NSSAI(s), the DNN, the PDU session ID, the ID of the third network entity 500, as well as the access type of the PDU session, for easily identifying the right third network entity 500 for a given PDU session. Additional information can be used by the first network entity 100 to identify the appropriate third network entity 500 for a given PDU session such as e.g. subscription permanent identifier (SUPI), AMF ID, request type, policy control function (PCF) ID, priority access, (small data rate control status), N1 session management (SM) container (PDU session establishment request), user location information, access type, permanent equipment identifier (PEI), generic public subscription identifier (GPSI), UE presence in local area data network (LADN) service area, subscription for PDU session status notification, DNN selection mode, trace requirements, control plane CIoT 5GS optimization indication, or control plane only indicator. The information needed to identify the third network entity 500 may be provided to the first network entity 100 by the second network entity 300 in the first message 510.

In case the first network entity 100 interacts with the third network entity 500 through an AMF, the AMF ID may be the UE's globally unique AMF ID (GUAMI) which uniquely identifies the AMF serving the UE and the GUAMI may be comprised in the first message 510.

The third network entity 500 receives the third message 530 indicating the request for QoS requirement of the PDU session from the first network entity 100. Based on the received third message 530, the third network entity 500 obtains a QoS requirement of the PDU session in step II in FIG. 8. As described with reference to FIG. 7, the QoS requirement of the PDU session may be at least one of a network layer QoS parameter and a network layer QoS characteristics and/or may be associated with a QoS flow of the PDU session. The QoS requirement of the PDU session is available to the third network entity 500, as the third network entity 500 is responsible for controlling and managing QoS associated with a PDU session. The third network entity 500 may hence obtain the QoS requirement of the PDU session for example by fetching the QoS requirement of the PDU session from a database or memory. In step III in FIG. 8, the third network entity 500 transmits a fourth message 540 to the first network entity 100, where the fourth message 540 indicates the obtained QoS requirement of the PDU session. The first network entity 100 receive the fourth message 540 indicating the QoS requirement of the PDU session from the third network entity 500 and obtains the QoS requirement of the PDU session from the fourth message 540. The obtained QoS requirement of the PDU session may be used by the first network entity 100 to monitor for non-fulfilment of the obtained QoS requirement, as described above with reference to step III in FIG. 7.

The first network entity 100 herein may be denoted as a network data analysis function (NWDAF). The NWDAF may be a function configured for communication in 3GPP related Long-Term Evolution (LTE) and LTE-Advanced, in WiMAX and its evolution, and in fifth generation wireless technologies, such as new radio (NR).

The second network entity 300 herein may be denoted as an application function (AF). The AF may be a function configured for communication in 3GPP related LTE and LTE-Advanced, in WiMAX and its evolution, and in fifth generation wireless technologies, such as new radio (NR).

The third network entity 500 herein may be denoted as a session management function (SMF) or an access and management function (AMF). The SMF or the AMF may be a function configured for communication in 3GPP related LTE and LTE-Advanced, in WiMAX and its evolution, and in fifth generation wireless technologies, such as new radio (NR).

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network entity 100, the second network entity 300, and the third network entity 500 comprises the necessary communication capabilities in the form of e.g., functions, means, units, elements, etc., for performing the solution. Examples of other such means, units, elements and functions comprise: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first network entity 100, the second network entity 300, and the third network entity 500 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A first network entity, comprising:
at least one processor; and
one or more memories including computer-executable instructions that, when executed by the at least one processor, cause the first network entity to:
receive a first message from a second network entity, wherein the first message indicates a request for monitoring non-fulfilment of a quality of service (QoS) requirement of a packet data unit (PDU) session, and wherein the first network entity is a network data analytics function (NWDAF);
obtain the QoS requirement of the PDU session based on the first message, wherein the obtained QoS requirement is at least one of a network layer QoS parameter and a network layer QoS characteristics, wherein the obtained QoS requirement is associated with a QoS flow of the PDU session, and wherein the PDU session comprises a plurality of QoS flows, and each of the plurality of QoS flows is associated with a respective QoS requirement;
monitor for non-fulfilment of the obtained QoS requirement based on QoS estimates associated with the obtained QoS requirement; and
in response to detecting a non-fulfilment of the obtained QoS requirement, transmit a second message to the second network entity, wherein the second message indicates the non-fulfilment of the obtained QoS requirement of the PDU session.

2. The first network entity according to claim 1, wherein the first message indicates the PDU session by at least one of a PDU session identifier, a QoS flow identifier, an internet protocol (IP) address, a client device location, a public mobile network, PLMN, identifier associated with a client device, a data network name (DNN) and a single network slice selection assistance information (S-NSSAI).

3. The first network entity according to claim 1, wherein the obtaining the QoS requirement of the PDU session comprises:

transmit a third message to a third network entity, wherein the third message indicates a request for QoS requirement of the PDU session; and receive a fourth message from the third network entity, wherein the fourth message indicates a QoS requirement of the PDU session.

4. The first network entity according to claim 3, wherein the third message indicates the PDU session by at least one of a PDU session identifier, a QoS flow identifier, an IP address, a client device location, a PLMN identifier associated with a client device, a DNN, and a S-NSSAI.

5. The first network entity according to claim 1, wherein the detecting a non-fulfilment of the obtained QoS requirement comprises:

detecting that a QoS estimate associated with the obtained QoS requirement is below or above a threshold value.

6. The first network entity according to claim 5, wherein the detecting a non-fulfilment of the obtained QoS requirement further comprises at least one of:

detecting that the QoS estimate associated with the obtained QoS requirement is below or above the threshold value in a location; and detecting that the QoS estimate associated with the obtained QoS requirement is below or above the threshold value during a time period.

7. The first network entity according to claim 6, wherein the first message further indicates at least one of the threshold value, the location, and the time period.

8. The first network entity according to claim 5, wherein the second message further indicates at least one of the QoS estimate associated with the obtained QoS requirement, a location, a time period, and a confidence level associated with the QoS estimate.

9. A second network entity comprising:

at least one processor; and one or more memories including computer-executable instructions that, when executed by the at least one processor, cause the second network entity to:

transmit a first message to a first network entity, wherein the first message indicates a request for monitoring for non-fulfilment of a quality of service (QoS) requirement of a packet data unit (PDU) session, wherein the QoS requirement is at least one of a network layer QoS parameter configured for the PDU session and a network layer QoS characteristics configured for the PDU session, wherein the first network entity is a network data analytics function (NWDAF), wherein the QoS requirement of the PDU session is associated with a QoS flow of the PDU session, and wherein the PDU session comprises a plurality of QoS flows, and each of the plurality of QoS flows is associated with a respective QoS requirement; and receive a second message from the first network entity, wherein the second message indicates a non-fulfilment of the QoS requirement of the PDU session.

10. The second network entity according to claim 9, wherein the first message indicates the PDU session by at least one of a PDU session identifier, a QoS flow identifier, an IP address, a client device location, a PLMN identifier associated with a client device, a data network name (DNN), and a single network slice selection assistance information (S-NSSAI).

11. The second network entity according to claim 9, wherein the first message further indicates at least one of a threshold value, a location, and a time period.

12. The second network entity according to claim 9, wherein the second message further indicates at least one of a QoS estimate associated with the QoS requirement of the PDU, a location, a time period, and a confidence level associated with the QoS estimate.

13. A second network entity comprising:

at least one processor; and one or more memories including computer-executable instructions that, when executed by the at least one processor, cause the second network entity to:

receive a third message from a first network entity, wherein the third message indicates a request for quality of service (QoS) requirement of a packet data unit (PDU) session, and wherein the first network entity is a network data analytics function (NWDAF);

obtain the QoS requirement of the PDU session based on the third message, wherein the obtained QoS requirement is associated with a QoS flow of the PDU session, and wherein the PDU session comprises a plurality of QoS flows, and each of the plurality of QoS flows is associated with a respective QoS requirement; and transmit a fourth message to the first network entity, wherein the fourth message indicates the obtained QoS requirement of the PDU session.

14. The second network entity according to claim 13, wherein the third message indicates the PDU session by at least one of a PDU session identifier, a QoS flow identifier, an IP address, a client device location, a PLMN identifier associated with a client device, a data network name (DNN), and a single network slice selection assistance information (S-NSSAI).

15. The second network entity according to claim 13, wherein the QoS requirement of the PDU session is at least one of a network layer QoS parameter and a network layer QoS characteristics.

16. The first network entity according to claim 1, wherein monitor for non-fulfilment of the obtained QoS requirement based on the QoS estimates associated with the obtained QoS requirement comprises:

obtaining network performance data to derive network analytics associated with one or more key performance indicators; and determining the QoS estimates associated with the obtained QoS requirement based on the network analytics.

17. The first network entity according to claim 1, wherein the first message comprises a request to subscribe to monitoring for non-fulfilment of the QoS requirement of the PDU session.

18. The second network entity according to claim 9, wherein the first message comprises a request to subscribe to monitoring for non-fulfilment of the QoS requirement of the PDU session.

19. The first network entity according to claim 1, wherein the second message comprises a flag or an information element that indicates the non-fulfilment of the obtained QoS requirement of the PDU session.

17

18

20. The second network entity according to claim 9, wherein the second message comprises a flag or an information element that indicates the non-fulfilment of the QoS requirement of the PDU session.

* * * * *